United States Patent
Zabegaev

(10) Patent No.: US 9,587,969 B2
(45) Date of Patent: Mar. 7, 2017

(54) AUTOMATIC IDENTIFICATION OF SENSORS

(71) Applicant: LLC "Topcon Positioning Systems", Moscow (RU)

(72) Inventor: Andrey Nikolaevich Zabegaev, Korolev (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 14/787,976

(22) PCT Filed: Mar. 31, 2014

(86) PCT No.: PCT/RU2014/000228
§ 371 (c)(1),
(2) Date: Oct. 29, 2015

(87) PCT Pub. No.: WO2015/152750
PCT Pub. Date: Oct. 8, 2015

(65) Prior Publication Data
US 2016/0109270 A1    Apr. 21, 2016

(51) Int. Cl.
*G01D 21/02* (2006.01)
*G01P 15/02* (2013.01)
(Continued)

(52) U.S. Cl.
CPC ............. *G01D 21/02* (2013.01); *G01C 19/56* (2013.01); *G01P 15/02* (2013.01); *G01P 21/00* (2013.01); *E02F 3/845* (2013.01); *G01P 15/00* (2013.01)

(58) Field of Classification Search
CPC ......... G01D 21/02; G01P 15/02; G01P 21/00; G01P 15/00; G01C 19/56; E02F 3/845; E02F 9/264; E01C 19/004
See application file for complete search history.

(56) References Cited

U.S. PATENT DOCUMENTS

| 8,055,469 B2 | 11/2011 | Kulach et al. |
| 2006/0041361 A1 | 2/2006 | Matrosov |

(Continued)

FOREIGN PATENT DOCUMENTS

| WO | 2009035603 A2 | 3/2009 |
| WO | 2013119140 A1 | 8/2013 |

OTHER PUBLICATIONS

International Search Report and Written Opinion mailed Jan. 15, 2015, in connection with International Patent Application No. PCT/RU2014/000228, 7 pgs.
(Continued)

*Primary Examiner* — John Breene
*Assistant Examiner* — Mohammad Islam
(74) *Attorney, Agent, or Firm* — Chiesa Shahinian & Giantomasi PC

(57) ABSTRACT

Disclosed is a method for mapping network identifiers to a set of sensor modules that measure a three-dimensional action vector and that are sensitive to orientation in three-dimensional space. Each sensor module is mounted at a different position on a machine such that the orientation of each sensor module is different. The method includes one or two stages. In the first stage, the machine is placed in a stationary state, and measurements of a static action vector from a sensor module identified by a network identifier are correlated with expected measurements from a sensor module having a corresponding orientation and corresponding position. In the second stage, the machine is placed in a dynamic state, and measurements of a dynamic action vector from a sensor module identified by a network identifier are correlated with expected measurements from a sensor module having a corresponding orientation and corresponding position.

14 Claims, 10 Drawing Sheets

(51) Int. Cl.
*G01C 19/56* (2012.01)
*G01P 21/00* (2006.01)
*E02F 3/84* (2006.01)
*G01P 15/00* (2006.01)

(56) References Cited

U.S. PATENT DOCUMENTS

| | | | | |
|---|---|---|---|---|
| 2007/0131438 A1* | 6/2007 | Brandt | ............... | A01B 63/112 |
| | | | | 172/464 |
| 2009/0069987 A1* | 3/2009 | Omelchenko | ........... | E02F 3/842 |
| | | | | 701/50 |
| 2011/0264393 A1* | 10/2011 | An | ............... | G01P 15/008 |
| | | | | 702/104 |
| 2011/0301902 A1* | 12/2011 | Panagas | ............... | G01C 21/16 |
| | | | | 702/104 |
| 2012/0059554 A1* | 3/2012 | Omelchenko | ........... | E02F 3/845 |
| | | | | 701/50 |
| 2012/0215477 A1* | 8/2012 | Tuck | ............... | G01P 21/00 |
| | | | | 702/99 |
| 2012/0239258 A1* | 9/2012 | Konno | ............... | E02F 3/845 |
| | | | | 701/50 |
| 2013/0160543 A1* | 6/2013 | Kontz | ............... | G01C 19/5776 |
| | | | | 73/504.12 |
| 2013/0261902 A1* | 10/2013 | Zhdanov | ............... | E02F 3/7613 |
| | | | | 701/50 |
| 2014/0207331 A1* | 7/2014 | Kosarev | ............... | G05D 1/0891 |
| | | | | 701/34.4 |

OTHER PUBLICATIONS

V.A.Likhomanov et al., Experimental Implementation of the Method of Global Ice Loads' Estimation During the Expedition <<Shtokman-2008>>, Feb. 25, 2009.

* cited by examiner $$C_i = \begin{pmatrix} 1 & 0 & 0 \\ 0 & \cos(\alpha_{1i}) & -\sin(\alpha_{1i}) \\ 0 & \sin(\alpha_{1i}) & \cos(\alpha_{1i}) \end{pmatrix} \begin{pmatrix} \cos(\alpha_{2i}) & 0 & \sin(\alpha_{2i}) \\ 0 & 1 & 0 \\ -\sin(\alpha_{2i}) & 0 & \cos(\alpha_{2i}) \end{pmatrix} \begin{pmatrix} \cos(\alpha_{3i}) & -\sin(\alpha_{3i}) & 0 \\ \sin(\alpha_{3i}) & \cos(\alpha_{3i}) & 0 \\ 0 & 0 & 1 \end{pmatrix} \quad (E1)$$

FIG. 7A $$C_i = (\text{column 1} \quad \text{column 2} \quad \text{column 3}) \quad (E2)$$

column 1 =
$$\cos(\alpha_{2i})\cos(\alpha_{3i})$$
$$\cos(\alpha_{2i})\sin(\alpha_{3i})$$
$$-\sin(\alpha_{2i})$$

column 2 =
$$\sin(\alpha_{1i})\sin(\alpha_{2i})\cos(\alpha_{3i}) - \cos(\alpha_{1i})\sin(\alpha_{3i})$$
$$\sin(\alpha_{1i})\sin(\alpha_{2i})\sin(\alpha_{3i}) + \cos(\alpha_{1i})\cos(\alpha_{3i})$$
$$\sin(\alpha_{1i})\cos(\alpha_{2i})$$

column 3 =
$$\cos(\alpha_{1i})\sin(\alpha_{2i})\cos(\alpha_{3i}) + \sin(\alpha_{1i})\sin(\alpha_{3i})$$
$$\cos(\alpha_{1i})\sin(\alpha_{2i})\sin(\alpha_{3i}) - \sin(\alpha_{1i})\cos(\alpha_{3i})$$
$$\cos(\alpha_{1i})\cos(\alpha_{2i})$$

FIG. 7B

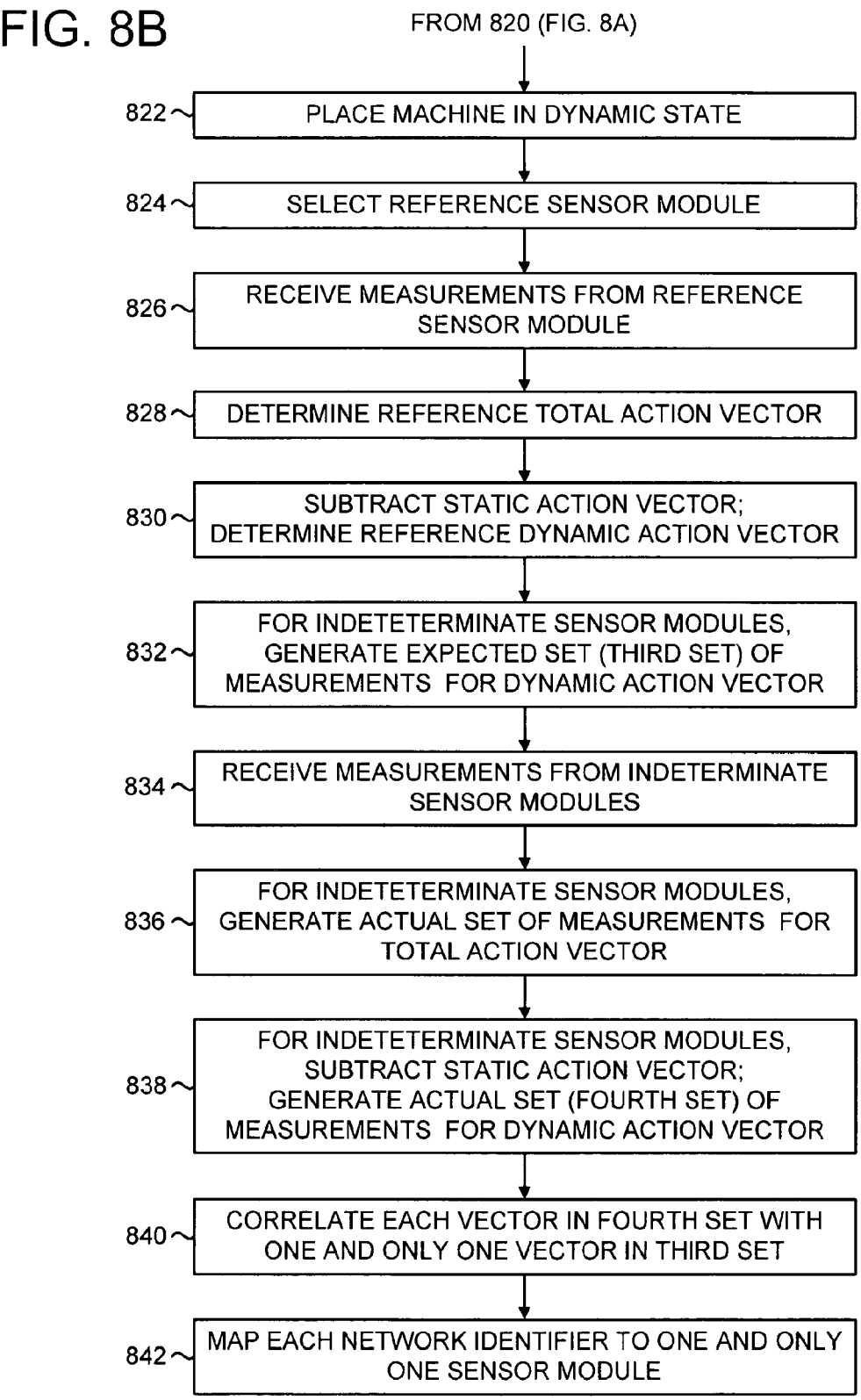

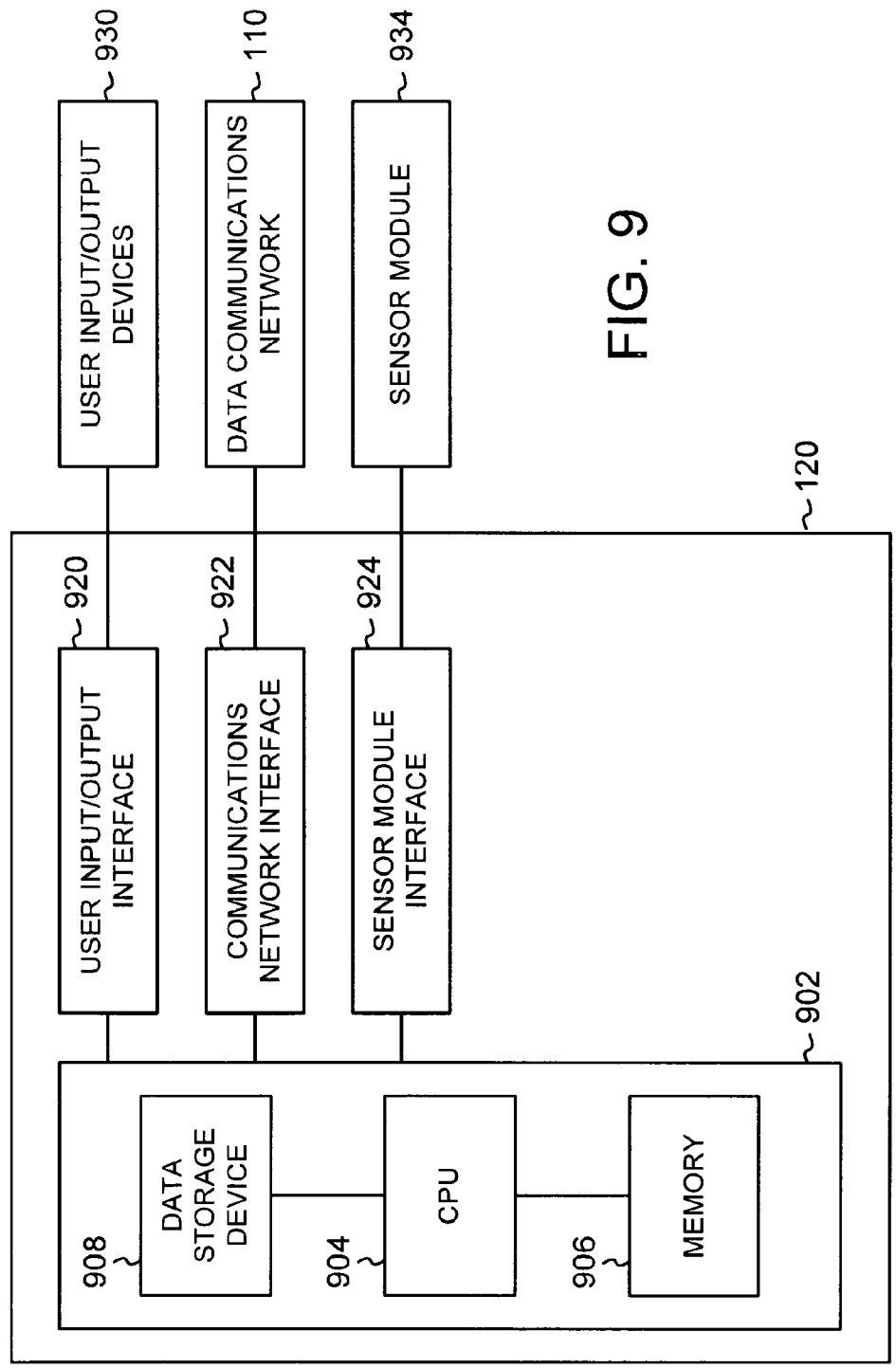

AUTOMATIC IDENTIFICATION OF SENSORS

CROSS-REFERENCE TO RELATED APPLICATIONS

This application is a national stage (under 35 U.S.C. 371) of International Patent Application No. PCT/RU2014/000228, filed Mar. 31, 2014, which is herein incorporated by reference in its entirety.

BACKGROUND OF THE INVENTION

The present invention relates generally to sensors, and more particularly to method and apparatus for automatic identification of sensors.

In many consumer, commercial, and industrial applications, multiple sensors are used for measurement and control; the sensors are typically mounted at various positions. In some configurations, the sensors exchange data with a data processing system via a communications network.

BRIEF SUMMARY OF THE INVENTION

According to an embodiment of the invention, a set of network identifiers is automatically mapped to a set of sensor modules. Each sensor module measures a three-dimensional action vector; each sensor module is sensitive to orientation in three-dimensional space; and each sensor module outputs measurements identified with a corresponding network identifier. Each sensor module is mounted at a corresponding position on a machine; and each sensor module has a corresponding orientation. There is a one-to-one correspondence between the position of a sensor module and the orientation of the sensor module: no two positions are the same, and no two orientations are the same.

The machine is placed in a stationary state, in which the machine is acted upon by a static impact vector. A first set of static action vectors in response to the static impact vector is generated. Each static action vector in the first set of static action vectors corresponds to an expected static action vector to be measured by a sensor module having a corresponding orientation and a corresponding position.

Sets of measurements are received from the set of sensor modules. Each set of measurements has a corresponding network identifier. A second set of static action vectors is generated from the measurements. Each static action vector in the second set of static action vectors is correlated with at least one static action vector in the first set of static action vectors. If a static action vector in the second set is correlated with one and only one static action vector in the first set, then the network identifier corresponding to the static action vector in the second set is mapped to the one and only one sensor module having the position corresponding to the static action vector in the first set.

If every static action vector in the second set is correlated with one and only one static action vector in the first set, then every network identifier is mapped to one and only one sensor module. If some of the static action vectors in the second set is correlated with one and only one static action vector in the first set and some of the static action vectors in the second set is correlated with more than one static action vector in the first set, then the sensor modules are sorted into two groups. For the sensor modules in the first group, a network identifier has been mapped to one and only one sensor module. For the sensors in the second group, a network identifier has been mapped to two or more sensor modules.

The machine is placed in a dynamic state, in which the machine is acted upon by a total impact vector including a dynamic impact vector and the static impact vector. A sensor module in the first group of sensor modules is selected as a reference sensor module. A set of measurements is received from the reference sensor module, and a reference total action vector in response to the total impact vector is determined from the set of measurements. A reference dynamic action vector in response to the dynamic impact vector is determined by subtracting the static action vector from the reference total action vector. A first set of dynamic action vectors is generated from the reference dynamic action vector. Each dynamic action vector in the first set of dynamic action vectors corresponds to an expected dynamic action vector to be measured by a sensor module in the second group of sensor modules.

Sets of measurements are received from the sensor modules in the second group of sensor modules. Each set of measurements has a corresponding network identifier. A set of total action vectors is determined from the sets of measurements, and a second set of dynamic action vectors is determined by subtracting the static action vector from each total action vector in the set of total action vectors. Each dynamic action vector in the second set of dynamic action vectors is correlated with one and only one dynamic action vector in the first set of dynamic action vectors. The network identifier corresponding to the dynamic action vector in the second set is mapped to the one and only one sensor module having the position corresponding to the dynamic action vector in the first set.

These and other advantages of the invention will be apparent to those of ordinary skill in the art by reference to the following detailed description and the accompanying drawings.

BRIEF DESCRIPTION OF THE DRAWINGS

FIG. 7A and FIG. 7B list the equations for rotation matrices;

FIG. 8A and FIG. 8B show a flowchart of a method for automatic identification of sensor modules; and FIG. 9 shows a high-level schematic of a data processing system.

DETAILED DESCRIPTION

Figure 1:
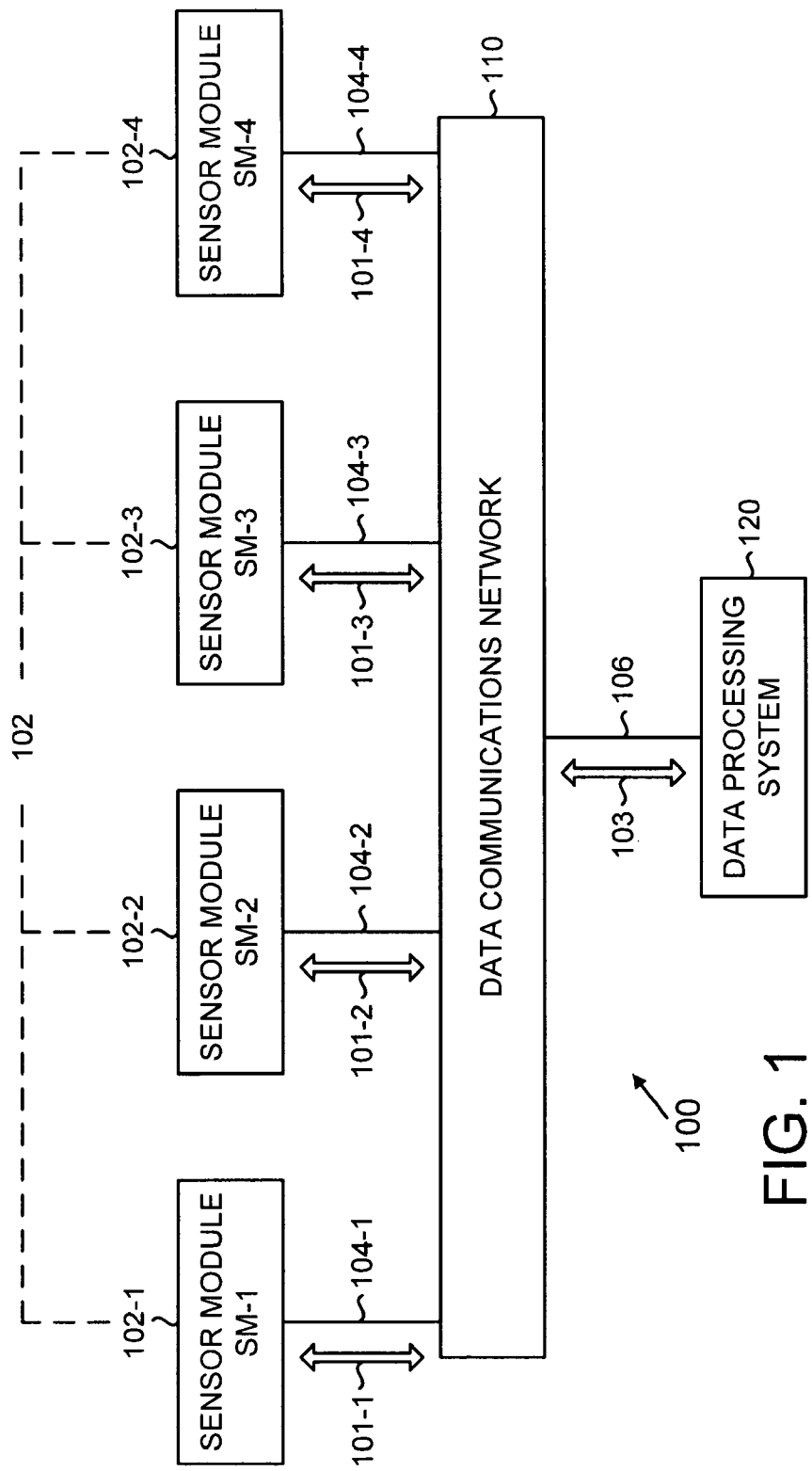
FIG. 1 shows a high-level schematic of a sensor network.

FIG. 1 shows a high-level schematic of an embodiment of a sensor network, referenced as sensor network 100, which includes a set of sensors 102. The set of sensors comprises individual sensor modules; each sensor module (SM) can include one or more sensors. In the example shown in FIG. 1, there are four sensor modules, referenced as SM-1 102-1, SM-2 102-2, SM-3 102-3, and SM-4 102-4. In general, there can be N sensors, where N is an integer greater than or equal to 1.

In the sensor network 100, each sensor module is connected to the data communications network 110 via a data link: sensor module SM-1 102-1 is connected via data link 104-1; sensor module SM-2 102-2 is connected via data link 104-2; sensor module SM-3 102-3 is connected via data link 104-3; and sensor module SM-4 102-4 is connected via data link 104-4. In addition, the data processing system 120 is connected to the data communications network 110 via the data link 106. Data is exchanged between the sensor modules and the data processing system via the data communications network. Data 101-1 is exchanged between the sensor module SM-1 102-1 and the data communications network 110; data 101-2 is exchanged between the sensor module SM-2 102-2 and the data communications network 110; data 101-3 is exchanged between the sensor module SM-3 102-3 and the data communications network 110; data 101-4 is exchanged between the sensor module SM-4 102-4 and the data communications network 110; and data 103 is exchanged between the data processing system 120 and the data communications network 110. In general, the data links can be implemented over a variety of physical media; for example, wires, coax cables, and optical fibers. The data links can also be wireless; for example, a data link can be a radiofrequency (RF) link or a free-space optical link.

The data communications network 110 can be implemented by variety of data network architectures and bus configurations. Examples of the data communications network include Ethernet and Internet Protocol (IP) networks. For vehicular applications, a widely used data communications network is the controller area network (CAN) bus.

In other sensor networks, a sensor module can exchange data with a data processing system directly, without an intermediate data communications network. In addition, if a sensor module has an analog signal interface instead of a digital data interface, signal conversion can be performed by an analog-to-digital converter (ADC) and a digital-to-analog converter (DAC). The signal converters can be coupled at various locations: for example, if a sensor module is connected to a data communications network, the signal converters can be coupled at the data communications network port; if a sensor module is coupled to the data processing system, without an intermediate data communications network, the signal converters can be coupled at the data processing system port.

Return to FIG. 1. For data communications, the data processing system and each sensor module is assigned a corresponding unique network identifier. For example, in an IP network, the network identifier is an IP address; in an Ethernet network, the network identifier is a media access control (MAC) address; and in a CAN network, the network identifier is a node (or station) identifier.

In general, the sensor modules are spatially distributed: each sensor module is located at a different position (physical location). Correlating a particular sensor module with a particular network identifier is typically a manual operation: an operator maintains a database containing entries for the position of a sensor module and its corresponding network identifier. If the position is changed, or if the network identifier is changed, the database must be updated manually.

Figure 2:
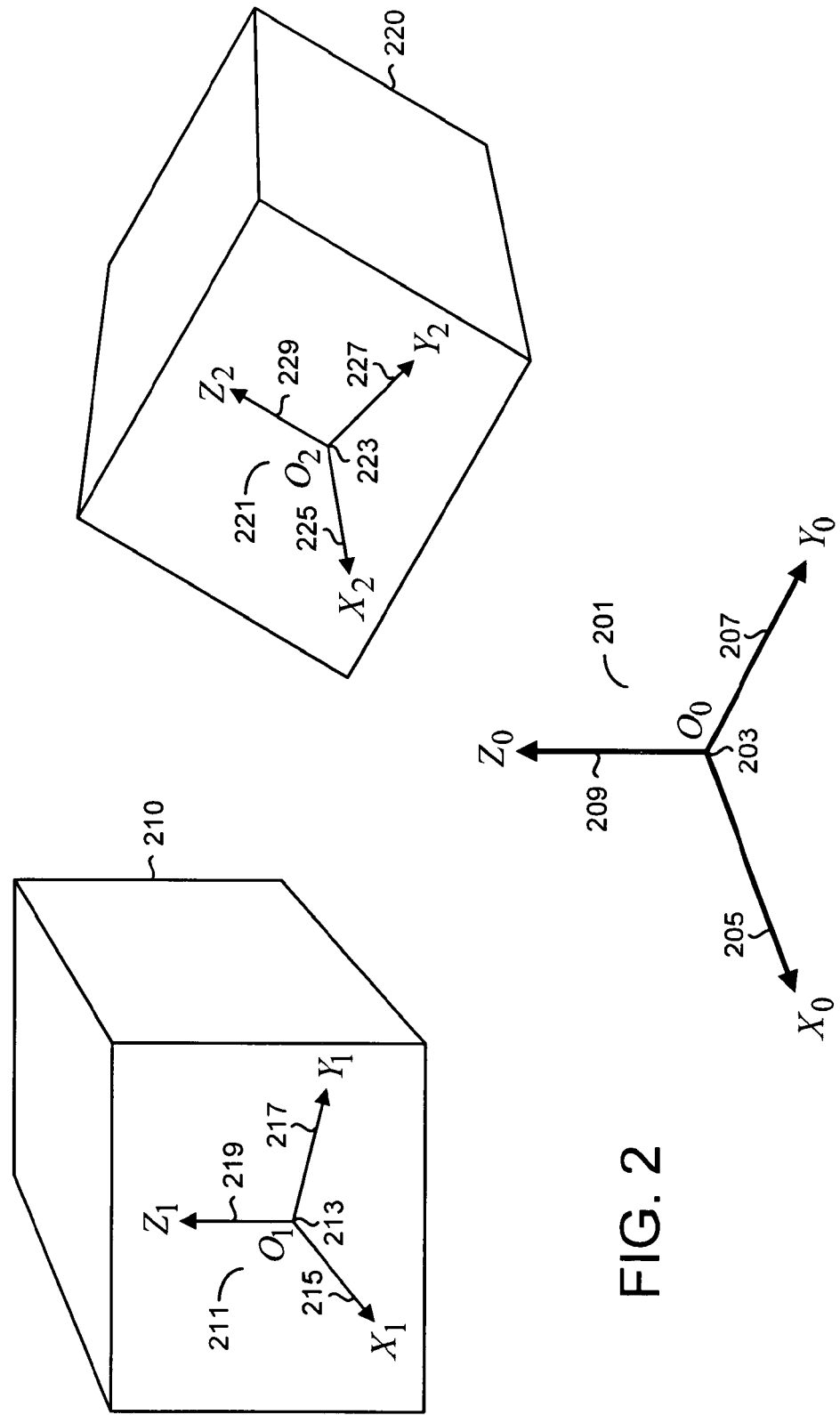
FIG. 2 shows examples of coordinate frames.

Refer to FIG. 2. Some sensor modules are sensitive to orientation (examples of such sensor modules are given below). For simplicity, Cartesian coordinate frames (three orthogonal axes) are used in the examples below; in general, other coordinate frames can be used. Coordinate frame 201 is a fixed reference Cartesian coordinate frame, with origin $O_0$ 203, $X_0$-axis 205, $Y_0$-axis 207, and $Z_0$-axis 209. Shown are two sensor modules, SM 210 and SM 220. For simplicity, the housings of the sensor modules are schematically represented by rectangular prisms; in general, the geometrical shapes are arbitrary.

The Cartesian coordinate frame 211 is fixed with respect to the housing of the sensor module 210; the Cartesian coordinate frame 211 has origin $O_1$ 213, $X_1$-axis 215, $Y_1$-axis 217, and $Z_1$-axis 219. Similarly, the Cartesian coordinate frame 221 is fixed with respect to the housing of the sensor module 220; the Cartesian coordinate frame 221 has origin $O_2$ 223, $X_2$-axis 225, $Y_2$-axis 227, and $Z_2$-axis 229. The Cartesian coordinate frame 211 and the Cartesian coordinate frame 221 are referred to as sensor module coordinate frames. In general, the origin of a sensor module coordinate frame can be translated relative to the origin of the fixed reference coordinate frame 201, and the axes of a sensor module coordinate frame can be rotated relative to the axes of the fixed reference coordinate frame 201.

Figure 3:
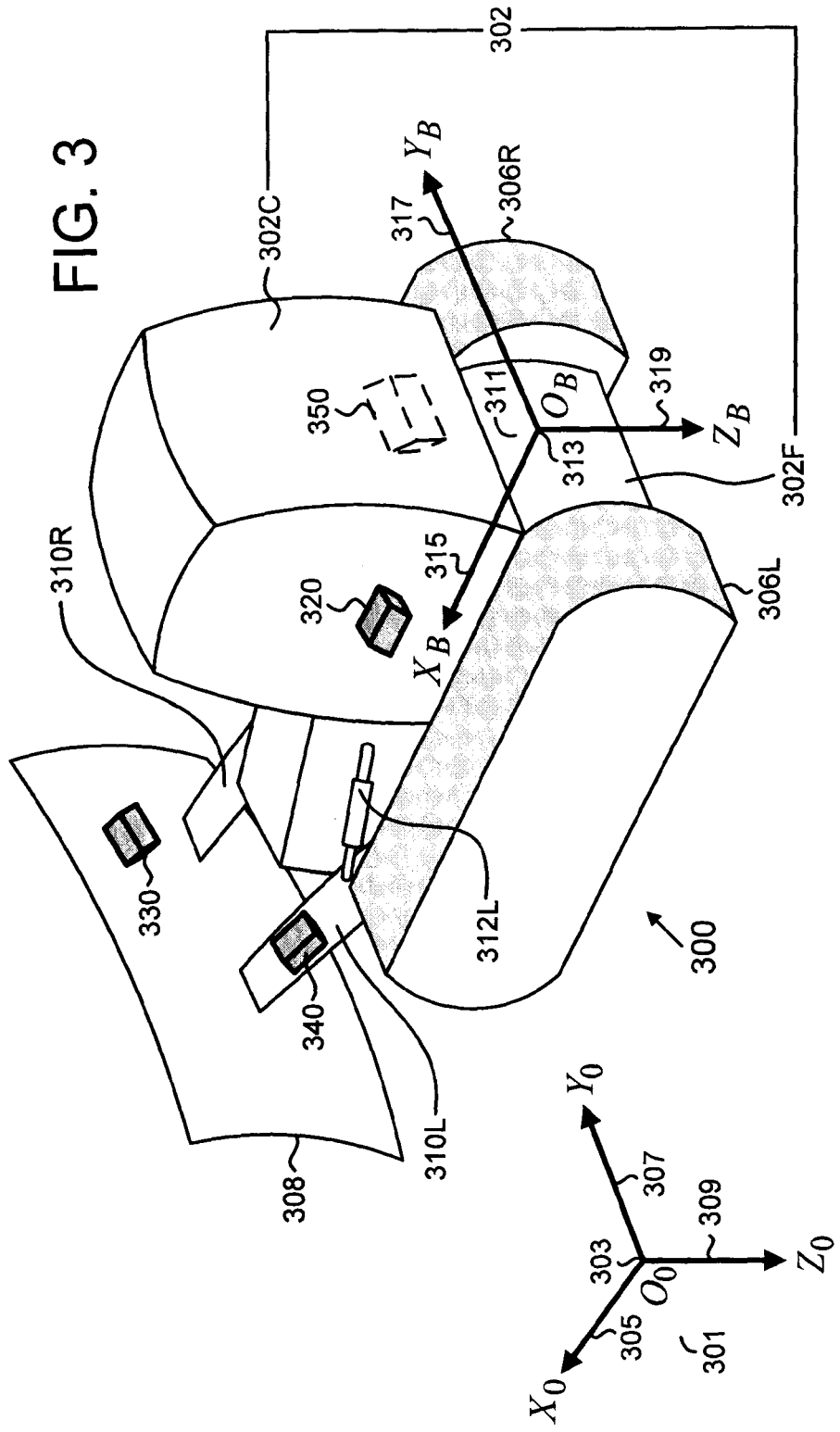
FIG. 3 shows a dozer equipped with sensor modules.

FIG. 3 shows an application in which a set of sensor modules are mounted onto a dozer 300. The dozer 300 includes a dozer body 302 and a dozer blade 308. The dozer body 302 includes a mainframe 302F and a cabin 302C, in which the operator sits. The dozer 300 travels across ground via a left track 306L and a right track 306R. The dozer blade 308 is operably coupled to the dozer body 302 via a left support arm 310L and a right support arm 310R.

The dozer blade 308 can move relative to the dozer body 302. In general, both the position and the attitude (angular orientation) of the dozer blade 308 relative to the dozer body 302 can be controlled. Movement of the left support arm 310L is controlled by a left hydraulic cylinder 312L; movement of the right support arm 310R is controlled by a corresponding right hydraulic cylinder (not shown). The hydraulic cylinders can be controlled manually by an operator or automatically by a computer control system.

Also shown in FIG. 3 are two coordinate frames. Coordinate frame 301 is a fixed reference Cartesian coordinate frame, with origin $O_0$ 303, $X_0$-axis 305, $Y_0$-axis 307, and $Z_0$-axis 309. For example, coordinate frame 301 is fixed with respect to the ground, and $Z_0$ points along the local gravity vector. The Cartesian coordinate frame 311 is fixed with respect to the dozer body 302; the Cartesian coordinate frame 311 has origin $O_B$ 313, $X_B$-axis 315, $Y_B$-axis 317, and $Z_B$-axis 319.

For grading operations, parameters such as the height of the dozer blade above the ground and the slope of the dozer blade relative to the ground are controlled. A system-state estimate system computes an estimate of the current system state and generates a feedback signal corresponding to the estimate of the current system state. In a manual control system, the feedback signal is inputted into a display system that displays the current values of the dozer blade parameters (such as the height and the slope of the dozer blade) on a screen, and an operator manually adjusts the dozer blade to achieve and maintain the desired (target) values of the dozer blade parameters. In an automatic control system, the feedback signal is transformed into a control signal that is used by a hydraulic control system to automatically control the height and the slope of the dozer blade.

The geometrical configurations of dozers and the degrees of freedom of the dozer blade relative to the dozer body vary among different models of dozers. In the most general case, a dozer blade can have up to six degrees of freedom (three angular rotations varying the relative attitude between the dozer blade and the dozer body and three translations varying the relative position between the dozer blade and the dozer body). In most cases, a dozer is equipped with a 4-way blade or a 6-way blade. A 4-way blade has two degrees of freedom: lift and tilt. The lift is adjustable in two ways (up and down), and the tilt is adjustable in two ways (clockwise and counter-clockwise). A 6-way blade has three degrees of freedom: lift, tilt, and angle. The lift is adjustable in two ways (up and down), the tilt is adjustable in two ways (clockwise and counter-clockwise), and the angle is adjustable in two ways (left and right).

An estimate of the current system state can be computed based on measurements from a set of sensor modules mounted on the dozer; the number, type, and position of the sensor modules can vary. [For more details, see "Estimation of the Relative Attitude and Position between a Vehicle Body and an Implement Operably Coupled to the Vehicle Body", International Application No. PCT/RU2012/000088, filed Feb. 10, 2012.] In this instance, the sensor modules are inertial measurement units (IMUs) that include one or more inertial sensors, such as accelerometers and gyros. In one configuration, an IMU includes three accelerometers that measure the acceleration along each of three orthogonal axes and three gyros that measure the angular velocity about each of the three orthogonal axes. In other configurations, depending on the degrees of freedom and required accuracy, an IMU with fewer inertial sensors can be used. A single inertial sensor (such as a single accelerometer or a single gyro) can also be used in some instances.

In the embodiment shown in FIG. 3, three IMUs are mounted on the dozer 300: IMU 320 is mounted on the dozer body 302; IMU 330 is mounted on the dozer blade 308; and IMU 340 is mounted on the left support arm 310L. In the example shown, the IMU 320 is mounted on the cabin 302C; however, it can also be mounted on the mainframe 302F. The IMU 330 is typically mounted on the back of the dozer blade 308. The three IMUs communicate with the data processing system 350 (shown mounted inside the cabin 302C) via a data communications network, as previously shown in FIG. 1; to simplify the drawing, data links are not shown.

Described herein is a method, according to an embodiment of the invention, for automatically correlating the network identifiers of sensor modules with the corresponding positions of the sensor modules. Each sensor module can measure the effects of applied influences in three-dimensional space; examples of the effects of applied influences include velocity, acceleration, angular velocity, and angular acceleration.

In an embodiment of the invention, the sensor modules are sensitive to orientation. Each sensor module is located at a different position, and each sensor module has a different orientation. Since each sensor module is mapped to a corresponding position and a corresponding orientation, if the corresponding orientation is known, then the corresponding position is also known. In the method described below, data transmitted from a sensor module identified by its corresponding network identifier is processed to determine the corresponding orientation of the sensor module. The corresponding position of the sensor module is then determined from the corresponding orientation of the sensor module; for example, a look-up table can contain entries correlating position and orientation. Consequently, a network identifier of a sensor module can be mapped to the position of the sensor module.

The method includes one or two stages. In the first stage, dozer is placed in a stationary state, and the orientation of each sensor module is determined relative to a static impact vector. As used herein, a static impact vector has a fixed magnitude and a fixed orientation; examples of static impact vectors include the gravity vector, the Earth angular velocity vector, and the Earth magnetic-field vector. For some configurations, the positions of all sensor modules are determined in the first stage alone. In other configurations, the positions of all sensor modules are not determined in the first stage alone, and a second stage is performed. In the second stage, the dozer is placed in a dynamic state, a particular sensor module determined from the first stage is selected as a reference sensor module, and a dynamic test is performed to define the orientations of the other sensor modules (one or more) relative to the reference sensor module.

A simplified example is first described to illustrate the principles of the method; a general algorithm is then described below.

First consider a configuration (subset of the configuration shown in FIG. 3) in which only two IMUs are mounted on the dozer: IMU 320 on the dozer body 302 and IMU 330 on the dozer blade 308. The data processing system 350 distinguishes between the two IMUs based on their unique network identifiers. As discussed above, in the prior art, an operator manually maintains a database correlating the network identifier and the position of each IMU. In an embodiment of the invention, to automatically determine the positions of the IMUs, each IMU is mounted such that the orientations of the IMUs are different.

Figure 4:
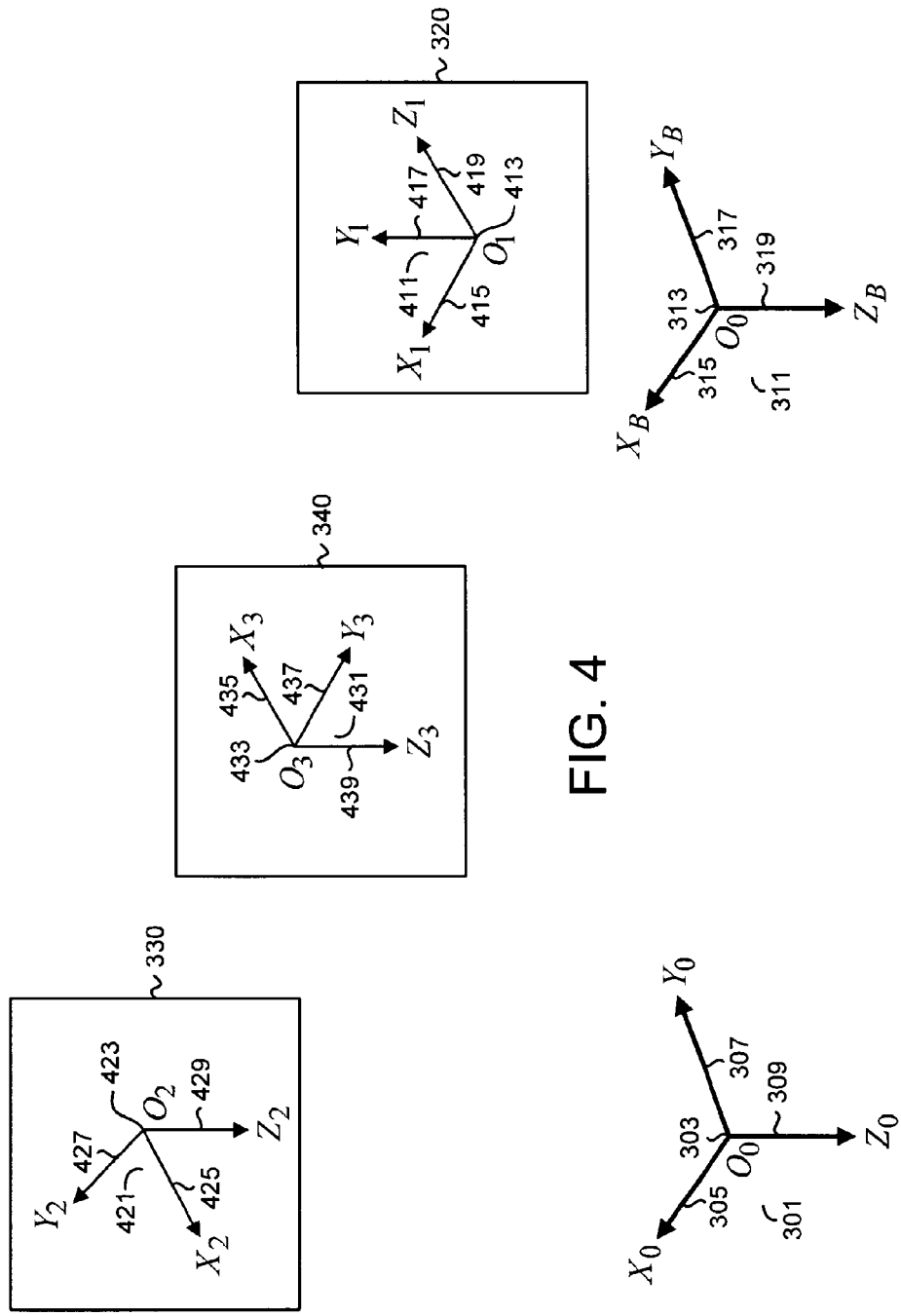
FIG. 4 shows the coordinate frames corresponding to sensor modules.

Refer to FIG. 4. The IMU 320 has a corresponding Cartesian coordinate frame 411, with origin $O_1$ 413, $X_1$-axis 415, $Y_1$-axis 417, and $Z_1$-axis 419. The IMU 330 has a corresponding Cartesian coordinate frame 421, with origin $O_2$ 423, $X_2$-axis 425, $Y_2$-axis 427, and $Z_2$-axis 429. To simplify the drawings, the IMUs are represented by two-dimensional rectangles. Also shown in FIG. 4 are the two coordinate frames from FIG. 3: the fixed reference Cartesian coordinate frame 301 and the dozer body Cartesian coordinate frame 311. In this instance, the $Z_0$-axis 309 is aligned with the local gravity vector g; the magnitude of the gravity vector is represented by $|g|$.

The method is performed as follows. The dozer is placed in a stationary state. The IMUs are oriented such that, when the dozer 300 is on near-level ground, and the dozer blade 308 is held in a near-horizontal position, the $Y_1$-axis of the IMU 320 is oriented approximately along the $-Z_0$-axis, and the $Z_2$-axis of the IMU 330 is oriented approximately along the $Z_0$-axis. When the dozer 300 is stationary, the acceleration vector measured by the IMU 320, denoted as $a_1=(a_{x1}, a_{y1}, a_{z1})$, will be $a_1 \approx (0, -|g|, 0)$; and the acceleration vector measured by the IMU 330, denoted as $a_2=(a_{x2}, a_{y2}, a_{z2})$, will be $a_2 \approx (0,0,|g|)$. Therefore, the position of each IMU can be determined by the measured acceleration vector under the conditions stated above.

Assume the data processing system receives measurements identified by network identifier $NI_1$ and network identifier $NI_2$. Assume the measurements with $NI_1$ yields the acceleration vector $(0,-|g|, 0)$ 0, and the measurements with $NI_2$ yields the acceleration vector $(0,0,|g|)$, then the network identifier $NI_1$ is mapped to IMU 320 (position on the dozer body), and the network identifier $NI_2$ is mapped to IMU 330 (position on the dozer blade).

Next consider the full configuration shown in FIG. 3, in which three IMUs are mounted on the dozer: IMU 320 on the dozer body 302, IMU 330 on the dozer blade 308, and IMU 340 on the left support arm 310L. Refer to FIG. 4. The first stage of the method is similar to the method described above for the configuration with the IMU 320 and the IMU 330 only. With the dozer 300 in a stationary state under the conditions described above, the acceleration vectors $a_1 \approx (0,-|g|,0)$ and $a_2 \approx (0,0,-|g|)$ are obtained as described above. The IMU 340 has a corresponding Cartesian coordinate frame 431, with origin $O_3$ 433, $X_3$-axis 435, $Y_3$-axis 437, and $Z_3$-axis 439. The IMU 340 is oriented such that, with the dozer in a stationary state under the conditions described above, the $Z_3$-axis is oriented approximately along the $Z_0$-axis. Therefore, the acceleration vector measured by the IMU 340, denoted as $a_3=(a_{x3}, a_{y3}, a_{z3})$, will be $a_3 \approx (0,0,|g|)$. Since $a_3 \approx a_2$, IMU 340 is not distinguishable from IMU 330 based only on the measured acceleration vectors, with the dozer in the stationary state under the conditions described above.

Assume the data processing system receives measurements identified by network identifier $NI_1$, network identifier $NI_2$, and network identifier $NI_3$. In the stationary state, assume the measurements with $NI_1$ yields the acceleration vector $(0,-|g|,0)$, the measurements with $NI_2$ yields the acceleration vector $(0,0,|g|)$, and the measurements with $NI_3$ yields the acceleration vector $(0,0,|g|)$, then the network identifier $NI_1$ is mapped to IMU 320 (position on the dozer body), but the network identifier $NI_2$ and the network identifier $NI_3$ are not uniquely mapped to an IMU.

In the first stage of the method, the position of the IMU 320 was identified as being on the dozer body 302. To distinguish between the IMU 330 and the IMU 340, the second stage of the method is performed as follows. The dozer is placed in a dynamic state. The dozer 300 moves forward along a near-horizontal plane; an accelerating force is applied to the dozer body. The acceleration vector measured by the IMU 320 is $a_1 \approx (a_{x1}, -|g|, 0)$, where $a_{x1}$ has a positive value. Similarly, the acceleration vector measured by the IMU 330 is $a_2 \approx (0, a_{y2}=a_{x1}, |g|)$, and the acceleration vector measured by the IMU 340 is $a_3 \approx (0, a_{y3}=-a_{x1}, |g|)$. Therefore, by comparing the acceleration vectors $a_2$ and $a_3$ when the dozer is accelerating forward, the IMU 330 can be distinguished from the IMU 340.

In the dynamic state, assume the measurements with $NI_1$ yields the acceleration vector $(a_{x1}, -|g|, 0)$, the measurements with $NI_2$ yields the acceleration vector $(0, a_{y2}=a_{x1}, |g|)$, and the measurements with $NI_3$ yields the acceleration vector $(0, a_{y3}=-a_{x1}, |g|)$, then the network identifier $NI_2$ is mapped to IMU 330 (positioned on the dozer blade), and the network identifier $NI_3$ is mapped to IMU 340 (positioned on the left support arm).

A general algorithm for correlating network identifiers and positions of sensor modules can be expressed as follows. The method is applicable for a set of two or more sensor modules mounted at different positions on a machine. The machine can translate or rotate relative to a fixed coordinate system (such as a coordinate system fixed to the ground). Herein, "translate or rotate" includes "translate only", "rotate only", and "both translate and rotate". In some instances, a machine includes a single machine component. In other instances, a machine includes two or more machine components operably coupled together: one machine component can translate or rotate relative to another machine component.

Examples of machines include construction machines [such as earthmoving machines (for example, dozers, graders, and excavators) and pavers] and agricultural machines (such as tractors and scrapers). In FIG. 3, for example, the machine is the dozer 300, the first machine component is the dozer body 302, the second machine component is the dozer blade 308, and the third machine component is the support arm 310L. Other examples of machines include land vehicles (such as cars, buses, trucks, and trains), water vehicles (such as boats and ships), and aircraft (such as planes and helicopters). Some machines (such as mixers, crushers, and cranes) have bases that are fixed to the ground.

Each sensor module includes one or more sensors. Examples of sensors include inertial sensors (such as accelerometers and gyros) and non-inertial sensors (such as magnetic compasses). Each sensor module measures a three-dimensional action vector in response to a three-dimensional impact vector applied to the machine. For example, if the impact vector is a force vector, the action vector is an acceleration vector; similarly, if the impact vector is a torque vector, the action vector is an angular acceleration vector. Each sensor module is sensitive to orientation in three dimensions. Each sensor module is mounted on the machine such that no two sensor modules have the same orientation; that is, there is a one-to-one correspondence between a sensor position and a sensor orientation. Each sensor module is identified by a network identifier; that is, there is a one-to-one correspondence between a sensor module and its network identifier. The method described herein maps a network identifier to a sensor module having a corresponding orientation and position.

Assume there are n sensor modules mounted on the machine at different positions, where n is an integer, and $n \geq 2$. Each sensor module can be mounted in one of m possible orientations, where m is an integer, and $m \geq n$. The sensor modules are mounted such that no two sensor modules have the same orientation. More than one sensor module can be mounted at different positions on the same machine component or on different machine components.

First define the following Cartesian coordinate frames:
  $S_0$ represents a fixed reference coordinate frame (for example, fixed with respect to the local ground);
  $S_B$ represents a coordinate frame fixed with respect to the machine body; and
  $S_i$ represents the local coordinate frame corresponding to the i-th sensor module $SM_i$, where $1 \leq i \leq n$; to simplify the terminology, $S_i$ is referred to as the i-th sensor module coordinate frame.

For a machine with only a single machine component, the machine body corresponds to the single machine component. For a machine with two or more machine components, one machine component can be selected as the machine body. In most instances, selection of the machine body is straightforward; for example, for the dozer 300 (FIG. 3), the dozer body 302 would be selected as the machine body.

Figure 5:
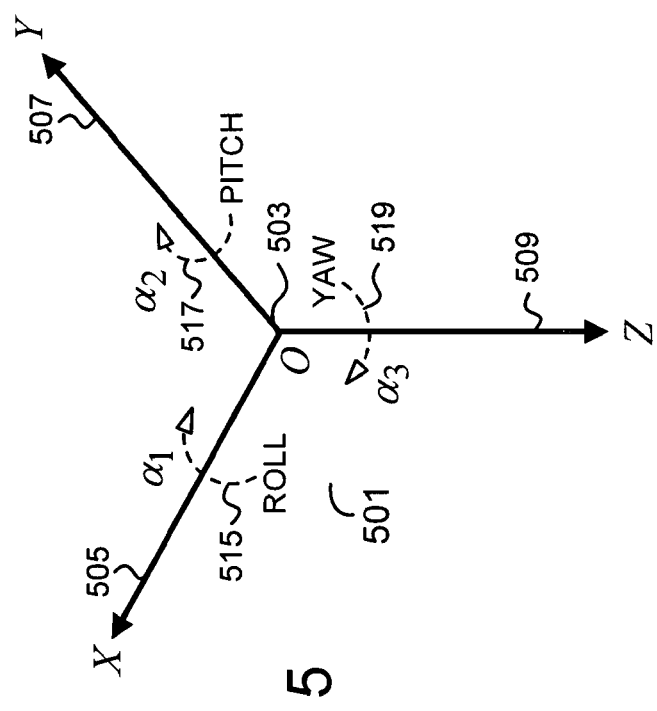
FIG. 5 shows a schematic of reference rotation angles.

Let $C_i$ represent the transformation from $S_B$ to $S_i$. The transformation can be expressed by various standard mathematical representations; for example, Euler angles, rotation matrices, and quaternions. As one example, rotation matrices are used. Refer to FIG. 5, which shows a coordinate frame 501, with origin O 503, X-axis 505, Y-axis 507, and Z-axis 509. Rotation about the X-axis is denoted the roll angle 515 ($\alpha_1$); rotation about the Y-axis is denoted the pitch angle 517 ($\alpha_2$); and rotation about the Z-axis is denoted the yaw angle 519 ($\alpha_3$).

Figure 6C:
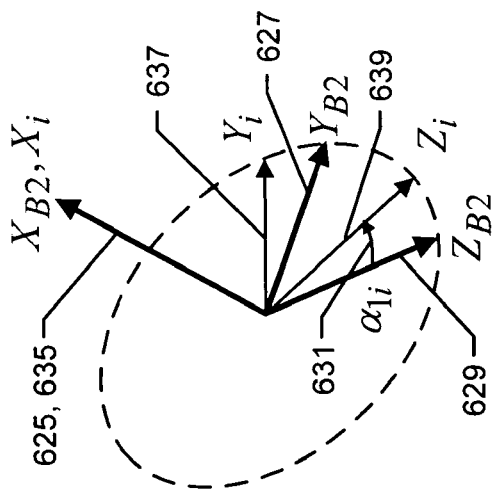
FIG. 6A-FIG. 6C show transformation from one coordinate frame to another coordinate frame.
Figure 6B:
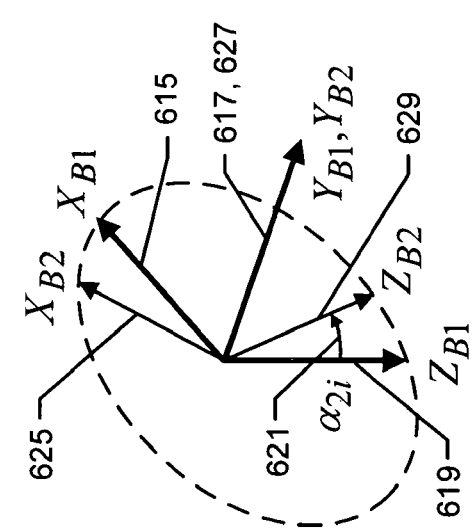
Figure 6A:
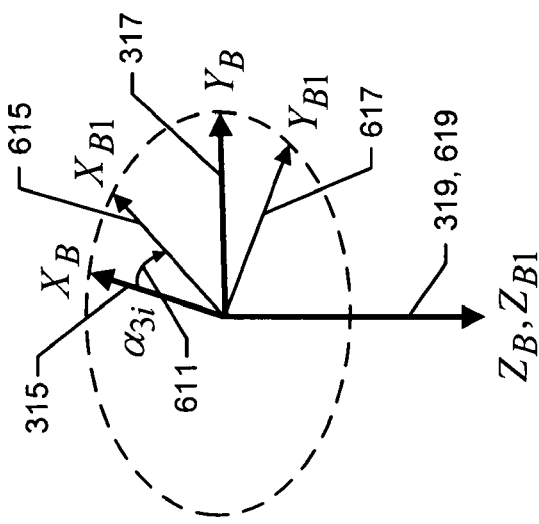

The transformation from $S_B$ to $S_i$ then proceeds as follows:
  (Refer to FIG. 6A) $S_B$ has the axes $X_B$ 315, $Y_B$ 317, $Z_B$ 319.
  (Refer to FIG. 6A) Rotate the axes ($X_B, Y_B$) about the axis $Z_B$ by the angle $\alpha_{3i}$ 611. The resulting coordinate frame is denoted $S_{B1}$ with axes $X_{B1}$ 615, $Y_{B1}$ 617, $Z_{B1}$ 619=$Z_B$ 319.
  (Refer to FIG. 6B) Rotate the axes ($X_{B1}, Z_{B1}$) about the axis $Y_{B1}$ by the angle $\alpha_{2i}$ 621. The resulting coordinate system is denoted $S_{B2}$ with axes $X_{B2}$ 625, $Y_{B2}$ 627=$Y_{B1}$ 617, $Z_{B2}$ 629.

(Refer to FIG. 6C) Rotate the axes $(Y_{B2}, Z_{B2})$ about the axis $X_{B2}$ by the angle $\alpha_{1i}$ 631. The resulting coordinate system is denoted $S_i$ with axes $X_i$ 635=$X_{B2}$ 625, $Y_i$ 637, $Z_i$ 639.

The rotation matrix $C_i$ can then be expressed by the product of three rotation matrices [(E1) in FIG. 7A]. Performing the matrix multiplication yields the expression for $C_i$ shown as (E2) in FIG. 7B. Then, $$C_i(X_B, Y_B, Z_B) = (X_i, Y_i, Z_i). \quad (E3)$$

Refer back to FIG. 3 and FIG. 4 for simplified examples of rotation matrices. Here, IMU 320 corresponds to $SM_1$; IMU 330 corresponds to $SM_2$; and IMU 340 corresponds to $SM_3$. Then the corresponding rotation matrices are the following:

$$C_1 = \begin{pmatrix} 1 & 0 & 0 \\ 0 & 0 & -1 \\ 0 & 1 & 0 \end{pmatrix}, \quad (E4)$$

$$C_2 = \begin{pmatrix} 0 & -1 & 0 \\ 1 & 0 & 0 \\ 0 & 0 & 1 \end{pmatrix}, \quad (E5)$$

$$C_3 = \begin{pmatrix} 0 & 1 & 0 \\ 0 & 0 & 1 \\ -1 & 0 & 0 \end{pmatrix}. \quad (E6)$$

Returning to the general algorithm, assume the following conditions (referred to herein as the system constraints):

The difference in orientation between the machine body coordinate frame $S_B$ and the fixed reference coordinate frame $S_0$ does not exceed a value $\pm \epsilon_1$, where $\epsilon_1$ is a positive value.

A change in orientation of the sensor modules relative to each other due to movement of the machine components does not exceed a value $\pm \epsilon_2$, where $\epsilon_2$ is a positive value; and Sensor accuracy shall provide orientation estimates within an accuracy of a value $\pm \epsilon_3$, where $\epsilon_3$ is a positive value.

The mutual orientation between two coordinate frames can be represented by various methods; for example, the axis-angle representation can be used.

Under these system constraints, there exists a limitation for the possible orientations of the sensor modules: the angle between any two sensor modules in the axis-angle representation should be more than $2\theta$, where $\theta = \epsilon_1 + \epsilon_2 + \epsilon_3$: that is, since the system constraints permit a variation of $\pm \theta$ for each sensor module, the angle between any two modules in the axis-angle representation should be more than $2\theta$ in order to avoid overlap.

The values of $\epsilon_1$, $\epsilon_2$, and $\epsilon_3$ are dependent on the particular machine and the application of interest. As one example, a dozer will typically operate on slopes of 25 deg or less, the blade can be raised up to 15 deg, and IMUs can provide 1 deg accuracy. Thus, $\epsilon_1 = 25$ deg, $\epsilon_2 = 15$ deg, $\epsilon_3 = 1$ deg, $\theta = 41$ deg, and $2\theta = 82$ deg. In this instance, the minimum difference in orientation between any two IMUs is 82 deg. As another example, consider a tractor with a mainframe and a cabin. One IMU is mounted on the mainframe; and a second IMU is mounted on the cabin roof. The tractor will typically operate on slopes of 15 deg or less, and the orientation of the cabin roof with respect to the mainframe will typically be 5 deg or less. Thus, $\epsilon_1 = 15$ deg, $\epsilon_2 = 5$ deg, $\epsilon_3 = 1$ deg, $\theta = 21$ deg, and $2\theta = 42$ deg. In this instance, the minimum difference in orientation between the two IMUs is 42 deg.

Figure 8A:
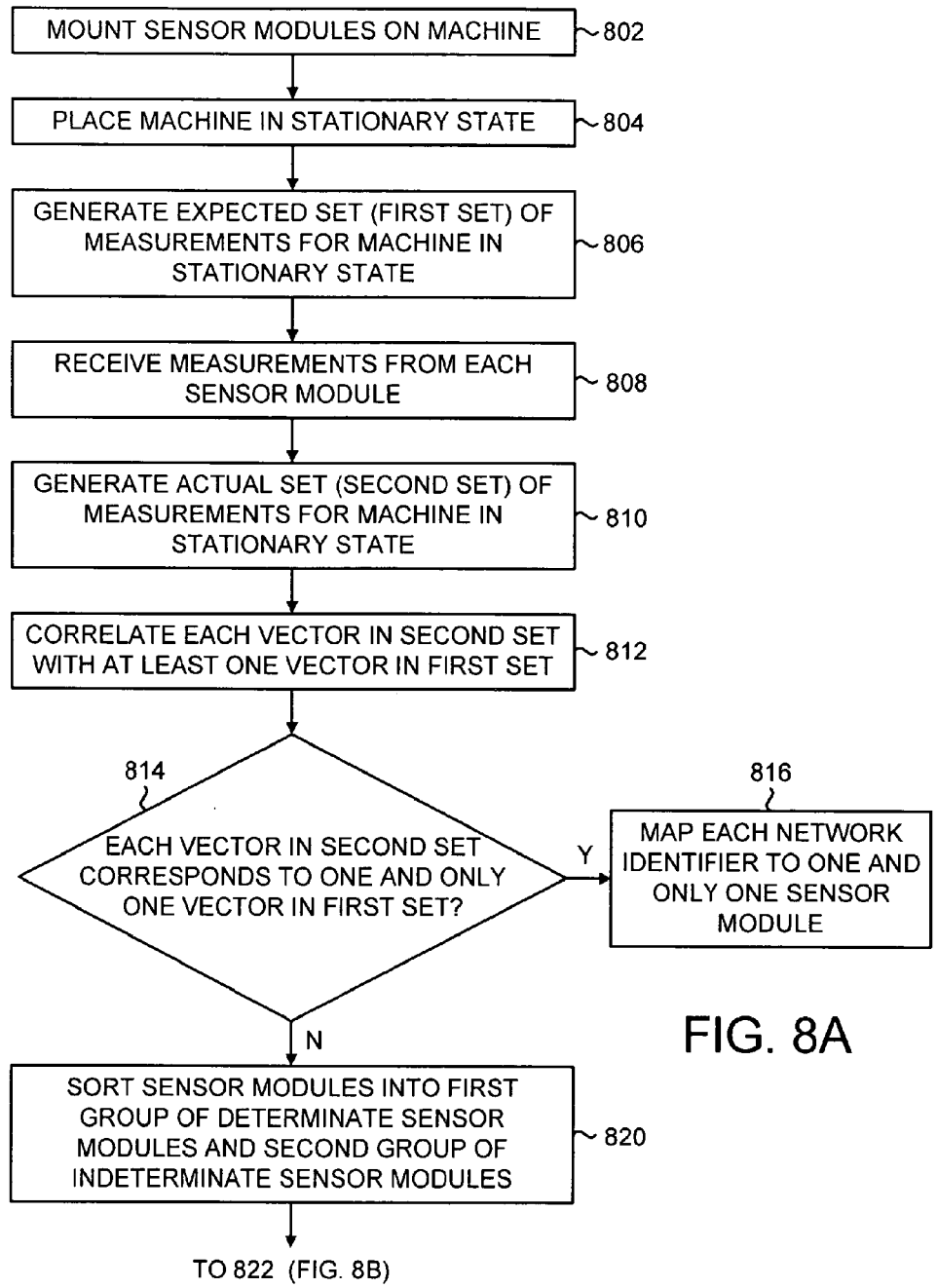

FIG. 8A and FIG. 8B show a flowchart of a method, according to an embodiment of the invention, for automatically mapping a network identifier to a sensor module having a corresponding orientation and position.

Refer to FIG. 8A. In step 802, the sensor modules are mounted on the machine. Each sensor module is mounted at a different position, and each sensor module is mounted at a different orientation. The process then passes to step 804, in which the machine is placed in a stationary state. In the stationary state, the machine is not translating or rotating relative to the fixed coordinate system, and the machine components are not translating or rotating relative to each other. In the stationary state, subject to the system constraints described above, the range of orientations of the sensor modules relative to the fixed coordinate system is known, and the range of orientations of the sensor modules relative to each other is known.

The process then passes to step 806, in which an expected set of measurements for the machine in the stationary state is generated; this set is referred to as the first set. In the stationary state, the machine is acted upon by a known static impact vector (such as the gravity vector, the Earth angular velocity vector, and the Earth magnetic-field vector). The static impact vector has a constant magnitude and direction; the static impact vector is specified relative to the fixed coordinate frame. The response of the machine to the static impact vector is a static action vector s; for example, if the static impact vector is the gravity vector, the static action vector is an acceleration vector. In the stationary state, for each sensor module, the expected measurements of the static action vector are known; the expected measurements are known, for example, from theoretical calculations or from calibration measurements. Note: Given the system constraints discussed above, the expected measurements are known to within a range dependent on $\theta$.

As discussed above, assume there is a total set of n sensor modules (SM), where n is an integer, and $n \geq 2$. Each sensor module is referenced by an integer index i, where $1 \leq i \leq n$. The i-th sensor module is denoted $SM_i$; and the total set of sensor modules is denoted $\{SM_i\}$. A sensor module $SM_i$ has a corresponding i-th orientation and a corresponding i-th position. For each sensor module $SM_i$, the expected measurements of the static action vector are denoted as the vector $(s_{xi}, s_{yi}, s_{zi})$, where the vector components are the expected measurements relative to the i-th sensor module local coordinate frame $S_i$, with orthogonal axes $(X_i, Y_i, Z_i)$. The total set of expected measurements from the total set of sensor modules is denoted $\{s_{xi}, s_{yi}, s_{zi})\}$; this is the first set. In one embodiment, the static action vector s is known relative to the coordinate frame fixed to the machine body, and the whole set of transformations $C_i$ (described above) is applied to the static action vector s to generate the set $\{C_i s\} = \{s_{xi}, s_{yi}, s_{zi})\}$.

The process then passes to step 808, in which measurements from each sensor module are received. The measurements are received, for example, by a data processing system, such as the data processing system 120 in FIG. 1. The measurements transmitted by a particular sensor module are identified by the corresponding network identifier (NI) of the sensor module; the network identifier is transmitted along with the measurements. In this step, only the network identifier of the sensor module transmitting the measurements is known; the position of the sensor module transmitting the measurements is not known.

The process then passes to step 810, in which the actual set of measurements for the machine in the stationary state is generated; this set is referred to as the second set. Each network identifier is referenced by an integer j, where $1 \leq j \leq n$. The j-th network identifier is denoted $NI_j$; and the total set of network identifiers is denoted $\{NI_j\}$. For each network identifier $NI_j$, the actual measurements of the static action vector are denoted as the vector $(\sigma_{xj}, \sigma_{yj}, \sigma_{zj})$, where the vector components are the actual measurements relative to the j-th sensor module local coordinate frame $S_j$, with orthogonal axes $(X_j, Y_j, Z_j)$. Here the j-th sensor module $SM_j$ is the sensor module corresponding to the j-th network identifier $NI_j$. The total set of actual measurements from the total set of network identifiers is denoted $\{(\sigma_{xj}, \sigma_{yj}, \sigma_{zj})\}$; this is the second set.

The process then passes to step 812, in which each vector in the second set is correlated with at least one vector in the first set. There is a criterion for proving that a vector in the second set corresponds to (matches) a vector in the first set: the angle in the axis-angle representation between the two vectors is less than an angle $\theta$ [or, equivalently, the scalar product of the two vectors is greater than $\sin(\theta)$]. If a vector in the second set matches a single vector in the first set (that is, the vector in the second set corresponds to one and only one vector in the first set), then the sensor module (identified by the network identifier) that generated the vector in the second set corresponds to the sensor module (identified by the orientation and the position) that generated the vector in the first set.

The process then passes to the decision step 814. If each vector in the second set corresponds to one and only one vector in the first set, then the process passes to step 816, in which each unique network identifier is mapped to a sensor module with a unique orientation and a unique position. In step 814, if each vector in the second set does not correspond to one and only one vector in the first set (that is, at least one vector in the second set corresponds to one and only one vector in the first set, and at least one vector in the second set corresponds to two or more vectors in the first set), then the process passes to step 820. [Note: The system is configured to guarantee that at least one vector in the second set corresponds to one and only one vector in the first set.]

In step 820, the sensor modules are sorted into two groups, a first group and a second group. The sensor modules in the first group are referred to as determinate sensor modules; for a determinate sensor module, a unique network identifier is mapped to a sensor module with a unique orientation and a unique position. The sensor modules in the second group are referred to as indeterminate sensor modules; for an indeterminate a sensor module, a unique network identifier has not been mapped to a sensor module with a unique orientation and a unique position.

The process then passes to step 822 (FIG. 8B), in which the machine is placed in a dynamic state. In the dynamic state, the machine is translating or rotating relative to the fixed coordinate system, or the machine components are translating or rotating relative to each other (the machine can be translating or rotating relative to the fixed coordinate system and, simultaneously, the machine components can be translating or rotating relative to each other). In the dynamic state, the machine is acted upon by a dynamic impact vector (such as an applied acceleration, applied rotation, or applied magnetic field). The response of the machine to the dynamic impact vector is a dynamic action vector d. The total action vector t is then the sum of the dynamic action vector and the static action vector: $t = d + s$.

The angle between the dynamic action vector d and the static action vector s should be greater than $\theta$; in an advantageous embodiment, the angle between the dynamic action vector and the static action vector is 90 degrees (that is, the dynamic action vector and the static action vector are orthogonal).

The process then passes to step 824, in which a reference sensor module is selected from the group of determinate sensor modules identified in step 820. The process then passes to step 826, in which measurements are received from the reference sensor module. The process then passes to step 828, in which the reference total action vector t is determined from the measurements. The process then passes to step 830, in which the static action vector s, previously determined in step 810, is subtracted from the reference total action vector t to determine the reference dynamic action vector d.

The process then passes to step 832. For each sensor module $SM_i$, the expected measurements of the dynamic action vector are denoted as the vector $(d_{xi}, d_{yi}, d_{zi})$. The vector $(d_{xi}, d_{yi}, d_{zi})$ can be generated from the reference dynamic action vector d by suitable coordinate transformations, as described above. The set of expected measurements for the set of indeterminate sensor modules is denoted $\{(d_{xi}, d_{yi}, d_{zi})\}$ (here the range of i spans the set of indeterminate sensor modules); this is the third set.

The process then passes to step 834, in which measurements from each indeterminate sensor module are received. The process then passes to step 836, in which the actual set of measurements for the total action vector is determined for each indeterminate sensor module. The process then passes to step 838, in which the static action vector is subtracted from the total action vector to generate the actual set of measurements for the dynamic action vector. For each network identifier $NI_j$, the actual measurements of the dynamic action vector are denoted as the vector $(\delta_{xj}, \delta_{yj}, \delta_{zj})$. The set of actual measurements from the set of network identifiers for the set of indeterminate sensor modules is denoted $\{(\delta_{xj}, \delta_{yj}, \delta_{zj})\}$; this is the fourth set.

The process then passes to step 840, in which each vector in the fourth set is correlated with one and only one vector in the third set. The process then passes to step 842, in which each unique network identifier is mapped to a sensor module with a unique orientation and a unique position.

In summary, the method described above includes two stages: in the first stage, the machine is placed in a stationary state; in the second stage, the machine is placed in a dynamic state. In the first stage, the orientation of each sensor module in a plane perpendicular to the static action vector is determined to within an accuracy $\theta$. In the second stage, the orientation of each sensor module in a plane perpendicular to the dynamic action vector is determined to within an accuracy $\theta$. Since the angle between the dynamic action vector and the static action vector is greater than $\theta$, the orientation of each sensor module is uniquely determined. Since there is a one-to-one correspondence between the orientation and the position of a sensor module, the position of each sensor module is also uniquely determined. The orientation of a sensor module is determined from the measurements transmitted by the sensor module. Since the measurements are identified by a network identifier, the network identifier is mapped to the position of the sensor module.

The method described above can be used during initial (startup) configuration of a system to map network identifiers to positions of sensor modules. The method can also be used to monitor changes in the system configuration during system operation.

An embodiment of the data processing system 120 (FIG. 1) is shown in FIG. 9. The data processing system 120 can be configured, programmed, and operated by a control engineer or dozer operator (the dozer operator can be restricted to only a subset of functions). One skilled in the art can construct the data processing system 120 from various combinations of hardware, firmware, and software. One skilled in the art can construct the data processing system 120 from various electronic components, including one or more general purpose processors (such as microprocessors), one or more digital signal processors, one or more application-specific integrated circuits (ASICs), and one or more field-programmable gate arrays (FPGAs).

The data processing system 120 includes a computer 902, which includes a processor [referred to as a central processing unit (CPU)] 904, memory 906, and a data storage device 908. The data storage device 908 includes at least one persistent, non-transitory, tangible computer readable medium, such as non-volatile semiconductor memory, a magnetic hard drive, or a compact disc read only memory.

The data processing system 120 further includes a communications network interface 922, which interfaces the computer 902 with the data communications network 110 (FIG. 1). As described above with reference to FIG. 1, the data processing system 120 can communicate with sensor modules via the data communications network 110. The data communications network 110 can further provide communications with a local area network or a wide area network. A user can access the computer 902 via a remote access terminal (not shown) communicating with the data communications network 110. Data, including computer executable code, can be transferred to and from the computer 902 via the communications network interface 922.

The data processing system 120 can further include a user input/output interface 920, which interfaces the computer 902 to user input/output devices 930. Examples of user input/output devices 930 include a keyboard, a mouse, a local access terminal, and a video display. Data, including computer executable code, can be transferred to and from the computer 902 via the user input/output interface 920.

The data processing system 120 can further include a sensor module interface 924, which interfaces the computer 902 to a sensor module 934. The data processing system 120 can communicate directly with the sensor module 934 via the sensor module interface 924.

Each of the interfaces described above can operate over different communications media. Examples of communications media include wires, cables, optical fibers, free-space optics, and electromagnetic waves (typically in the radiofrequency range and commonly referred to as a wireless interface).

As is well known, a computer operates under control of computer software, which defines the overall operation of the computer and applications. The CPU 904 controls the overall operation of the computer and applications by executing computer program instructions that define the overall operation and applications. The computer program instructions can be stored in the data storage device 908 and loaded into the memory 906 when execution of the program instructions is desired. The algorithm shown schematically in FIG. 8A and FIG. 8B can be defined by computer program instructions stored in the memory 906 or in the data storage device 908 (or in a combination of the memory 906 and the data storage device 908) and controlled by the CPU 904 executing the computer program instructions. For example, the computer program instructions can be implemented as computer executable code to perform algorithms; the computer program instructions can be programmed by one skilled in the art. Accordingly, by executing the computer program instructions, the CPU 904 executes the algorithm shown schematically in FIG. 8A and FIG. 8B.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for mapping a plurality of network identifiers to a plurality of sensor modules, wherein each particular sensor module in the plurality of sensor modules measures a three-dimensional action vector, wherein each particular sensor module in the plurality of sensor modules is sensitive to orientation in three-dimensional space, wherein each particular sensor module in the plurality of sensor modules outputs measurements identified with a particular network identifier in the plurality of network identifiers, and wherein no two particular network identifiers in the plurality of network identifiers are the same, the method comprising the steps of:

mounting each particular sensor module in the plurality of sensor modules to a corresponding particular position in a plurality of positions on a machine, wherein:
 each particular sensor module has a corresponding particular orientation in a plurality of orientations;
 no two particular positions in the plurality of positions are the same; and
 no two particular orientations in the plurality of orientations are the same;

placing the machine in a stationary state, wherein the machine is acted upon by a static impact vector;

generating a first set of static action vectors in response to the static impact vector, wherein each particular static action vector in the first set of static action vectors corresponds to an expected static action vector to be measured by a particular sensor module in the plurality of sensor modules;

receiving a plurality of sets of measurements from the plurality of sensor modules, wherein each particular set of measurements in the plurality of sets of measurements has a corresponding particular network identifier in the plurality of network identifiers;

generating a second set of static action vectors in response to the static impact vector, wherein each particular static action vector in the second set of static action vectors corresponds to an actual static action vector determined from a particular set of measurements in the plurality of sets of measurements;

correlating each particular static action vector in the second set of static action vectors with at least one particular static action vector in the first set of static action vectors; and for each particular static action vector in the second set of static action vectors:

determining whether the particular static action vector in the second set of static action vectors corresponds to one and only one particular static action vector in the first set of static action vectors; and upon determining that the particular static action vector in the second set of static action vectors corresponds to one and only one particular static action vector in the first set of static action vectors, mapping the particular network identifier corresponding to the particular static action vector in the second set of static action vectors to the one and only one particular sensor module having the particular position corresponding to the particular static action vector in the first set of static action vectors.

2. The method of claim 1, wherein the static impact vector comprises a gravity vector, an Earth angular velocity vector, or an Earth magnetic-field vector.

3. The method of claim 1, wherein:
the machine comprises a dozer comprising:
a dozer body; and
a dozer blade operably coupled to the dozer body; and
the plurality of sensor modules comprises a first inertial measurement unit mounted on the dozer body and a second inertial measurement unit mounted on the dozer blade, wherein:
the first inertial measurement unit comprises a first accelerometer, a second accelerometer, and a third accelerometer, wherein the first accelerometer, the second accelerometer, and the third accelerometer are orthogonally mounted; and
the second inertial measurement unit comprises a fourth accelerometer, a fifth accelerometer, and a sixth accelerometer, wherein the fourth accelerometer, the fifth accelerometer, and the sixth accelerometer are orthogonally mounted.

4. The method of claim 3, wherein:
the first inertial measurement unit further comprises a first gyro, a second gyro, and a third gyro, wherein the first gyro, the second gyro, and the third gyro are orthogonally mounted; and
the second inertial measurement unit further comprises a fourth gyro, a fifth gyro, and a sixth gyro, wherein the fourth gyro, the fifth gyro, and the sixth gyro are orthogonally mounted.

5. The method of claim 1, wherein the plurality of sets of measurements comprises a first plurality of sets of measurements, further comprising the steps of:
determining whether every particular static action vector in the second set of static action vectors corresponds to one and only one particular static action vector in the first set of static action vectors; and
upon determining that every particular static action vector in the second set of static action vectors does not correspond to one and only one particular static action vector in the first set of static action vectors:
sorting the plurality of sensor modules into a first group of sensor modules and a second group of sensor modules, wherein:
the first group of sensor modules comprises one or more sensor modules, wherein, for each particular sensor module in the first group of sensor modules, a particular network identifier has been mapped to one and only one particular sensor module; and
the second group of sensor modules comprises two or more sensor modules, wherein, for each particular sensor module in the second group of sensor modules, a particular network identifier has not been mapped to one and only one particular sensor module;
selecting a particular sensor module in the first group of sensor modules as a reference sensor module;
placing the machine in a dynamic state, wherein the machine is acted upon by a total impact vector comprising a dynamic impact vector and the static impact vector;
receiving measurements from the reference sensor module;
determining, based on the measurements received from the reference sensor module, a reference total action vector in response to the total impact vector;
determining a reference dynamic action vector in response to the dynamic impact vector by subtracting the static action vector from the reference total action vector;
generating a first set of dynamic action vectors in response to the dynamic impact vector, wherein:
each particular dynamic action vector in the first set of dynamic action vectors corresponds to an expected dynamic action vector to be measured by a particular sensor module in the second group of sensor modules; and
each particular dynamic action vector in the first set of dynamic action vectors is based on the reference dynamic action vector;
receiving a second plurality of sets of measurements from the sensor modules in the second group of sensor modules, wherein each particular set of measurements in the second plurality of sets of measurements has a corresponding particular network identifier in the plurality of network identifiers;
generating a set of total action vectors in response to the total impact vector, wherein each particular total action vector in the set of total action vectors corresponds to a total action vector determined from a particular set of measurements in the second plurality of sets of measurements;
generating a second set of dynamic action vectors in response to the dynamic impact vector, wherein each particular dynamic action vector in the second set of dynamic action vectors is determined by subtracting the static action vector from a particular total action vector in the set of total action vectors;
correlating each particular dynamic action vector in the second set of dynamic action vectors with one and only one dynamic action vector in the first set of dynamic action vectors; and
mapping the particular network identifier corresponding to the particular dynamic action vector in the second set of dynamic action vectors to the one and only one particular sensor module having the particular position corresponding to the particular dynamic action vector in the first set of dynamic action vectors.

6. The method of claim 5, wherein:
the machine comprises a dozer comprising:
a dozer body;
a dozer blade; and
a support arm operably coupling the dozer blade to the dozer body; and
the plurality of sensor modules comprises a first inertial measurement unit mounted on the dozer body, a second inertial measurement unit mounted on the dozer blade, and a third inertial measurement unit mounted on the support arm, wherein:
the first inertial measurement unit comprises a first accelerometer, a second accelerometer, and a third accelerometer, wherein the first accelerometer, the second accelerometer, and the third accelerometer are orthogonally mounted;
the second inertial measurement unit comprises a fourth accelerometer, a fifth accelerometer, and a sixth accelerometer, wherein the fourth accelerometer, the fifth accelerometer, and the sixth accelerometer are orthogonally mounted; and
the third inertial measurement unit comprises a seventh accelerometer, an eighth accelerometer, and a ninth accelerometer, wherein the seventh accelerometer, the eighth accelerometer, and the ninth accelerometer are orthogonally mounted.

7. The method of claim 6, wherein the static impact vector comprises a gravity vector and the dynamic impact vector comprises an accelerating force vector applied to the dozer body.

8. A measurement system comprising:
a plurality of sensor modules, wherein each particular sensor module in the plurality of sensor modules is:
configured to measure a three-dimensional action vector;
configured to be sensitive to orientation in three-dimensional space;
configured to output measurements identified with a particular network identifier in a plurality of network identifiers, wherein no two particular network identifiers in the plurality of network identifiers are the same;
mounted to a corresponding particular position in a plurality of positions on a machine and mounted with a corresponding particular orientation in a plurality of orientations, wherein:
no two particular positions in the plurality of positions are the same; and
no two particular orientations in the plurality of orientations are the same; and
a data processing system comprising:
a processor;
memory operably coupled to the processor; and
a data storage device operably coupled to the processor, wherein the data storage device stores computer program instructions, which, when executed by the processor, cause the processor to perform the method comprising the steps of:
in response to the machine being placed in a stationary state and in response to the machine being acted upon by a static impact vector:
generating a first set of static action vectors in response to the static impact vector, wherein each particular static action vector in the first set of static action vectors corresponds to an expected static action vector to be measured by a particular sensor module in the plurality of sensor modules;
receiving a plurality of sets of measurements from the plurality of sensor modules, wherein each particular set of measurements in the plurality of sets of measurements has a corresponding particular network identifier in the plurality of network identifiers;
generating a second set of static action vectors in response to the static impact vector, wherein each particular static action vector in the second set of static action vectors corresponds to an actual static action vector determined from a particular set of measurements in the plurality of sets of measurements;
correlating each particular static action vector in the second set of static action vectors with at least one particular static action vector in the first set of static action vectors; and
for each particular static action vector in the second set of static action vectors:
determining whether the particular static action vector in the second set of static action vectors corresponds to one and only one particular static action vector in the first set of static action vectors; and
upon determining that the particular static action vector in the second set of static action vectors corresponds to one and only one particular static action vector in the first set of static action vectors, mapping the particular network identifier corresponding to the particular static action vector in the second set of static action vectors to the one and only one particular sensor module having the particular position corresponding to the particular static action vector in the first set of static action vectors.

9. The measurement system of claim 8, wherein the static impact vector comprises a gravity vector, an Earth angular velocity vector, or an Earth magnetic-field vector.

10. The measurement system of claim 8, wherein:
the machine comprises a dozer comprising:
a dozer body; and
a dozer blade operably coupled to the dozer body; and
the plurality of sensor modules comprises a first inertial measurement unit mounted on the dozer body and a second inertial measurement unit mounted on the dozer blade, wherein:
the first inertial measurement unit comprises a first accelerometer, a second accelerometer, and a third accelerometer, wherein the first accelerometer, the second accelerometer, and the third accelerometer are orthogonally mounted; and
the second inertial measurement unit comprises a fourth accelerometer, a fifth accelerometer, and a sixth accelerometer, wherein the fourth accelerometer, the fifth accelerometer, and the sixth accelerometer are orthogonally mounted.

11. The measurement system of claim 10, wherein:
the first inertial measurement unit further comprises a first gyro, a second gyro, and a third gyro, wherein the first gyro, the second gyro, and the third gyro are orthogonally mounted; and
the second inertial measurement unit further comprises a fourth gyro, a fifth gyro, and a sixth gyro, wherein the fourth gyro, the fifth gyro, and the sixth gyro are orthogonally mounted.

12. The measurement system of claim 8, wherein the plurality of sets of measurements comprises a first plurality of sets of measurements, and wherein the method further comprises the steps of:
determining whether every particular static action vector in the second set of static action vectors corresponds to one and only one particular static action vector in the first set of static action vectors; and
upon determining that every particular static action vector in the second set of static action vectors does not correspond to one and only one particular static action vector in the first set of static action vectors:

sorting the plurality of sensor modules into a first group of sensor modules and a second group of sensor modules, wherein:

the first group of sensor modules comprises one or more sensor modules, wherein, for each particular sensor module in the first group of sensor modules, a particular network identifier has been mapped to one and only one particular sensor module; and the second group of sensor modules comprises two or more sensor modules, wherein, for each particular sensor module in the second group of sensor modules, a particular network identifier has not been mapped to one and only one particular sensor module;

selecting a particular sensor module in the first group of sensor modules as a reference sensor module;

in response to the machine being placed in a dynamic state and in response to the machine being acted upon by a total impact vector comprising a dynamic impact vector and the static impact vector:

receiving measurements from the reference sensor module;

determining, based on the measurements received from the reference sensor module, a reference total action vector in response to the total impact vector;

determining a reference dynamic action vector in response to the dynamic impact vector by subtracting the static action vector from the reference total action vector;

generating a first set of dynamic action vectors in response to the dynamic impact vector, wherein:

each particular dynamic action vector in the first set of dynamic action vectors corresponds to an expected dynamic action vector to be measured by a particular sensor module in the second group of sensor modules; and each particular dynamic action vector in the first set of dynamic action vectors is based on the reference dynamic action vector;

receiving a second plurality of sets of measurements from the sensor modules in the second group of sensor modules, wherein each particular set of measurements in the second plurality of sets of measurements has a corresponding particular network identifier in the plurality of network identifiers;

generating a set of total action vectors in response to the total impact vector, wherein each particular total action vector in the set of total action vectors corresponds to a total action vector determined from a particular set of measurements in the second plurality of sets of measurements;

generating a second set of dynamic action vectors in response to the dynamic impact vector, wherein each particular dynamic action vector in the second set of dynamic action vectors is determined by subtracting the static action vector from a particular total action vector in the set of total action vectors;

correlating each particular dynamic action vector in the second set of dynamic action vectors with one and only one dynamic action vector in the first set of dynamic action vectors; and mapping the particular network identifier corresponding to the particular dynamic action vector in the second set of dynamic action vectors to the one and only one particular sensor module having the particular position corresponding to the particular dynamic action vector in the first set of dynamic action vectors.

13. The measurement system of claim 12, wherein:

the machine comprises a dozer comprising:
a dozer body;
a dozer blade; and
a support arm operably coupling the dozer blade to the dozer body; and the plurality of sensor modules comprises a first inertial measurement unit mounted on the dozer body, a second inertial measurement unit mounted on the dozer blade, and a third inertial measurement unit mounted on the support arm, wherein:

the first inertial measurement unit comprises a first accelerometer, a second accelerometer, and a third accelerometer, wherein the first accelerometer, the second accelerometer, and the third accelerometer are orthogonally mounted;

the second inertial measurement unit comprises a fourth accelerometer, a fifth accelerometer, and a sixth accelerometer, wherein the fourth accelerometer, the fifth accelerometer, and the sixth accelerometer are orthogonally mounted; and the third inertial measurement unit comprises a seventh accelerometer, an eighth accelerometer, and a ninth accelerometer, wherein the seventh accelerometer, the eighth accelerometer, and the ninth accelerometer are orthogonally mounted.

14. The measurement system of claim 13, wherein the static impact vector comprises a gravity vector and the dynamic impact vector comprises an accelerating force vector applied to the dozer body.

* * * * *